(12) United States Patent
Steffes

(10) Patent No.: US 6,220,675 B1
(45) Date of Patent: Apr. 24, 2001

(54) HYDRAULIC BRAKE SYSTEM WITH HYDRAULIC SERVO BRAKE

(75) Inventor: Helmut Steffes, Hattersheim (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/269,244

(22) PCT Filed: Aug. 22, 1997

(86) PCT No.: PCT/EP97/04596

§ 371 Date: Jun. 7, 1999

§ 102(e) Date: Jul. 7, 1999

(87) PCT Pub. No.: WO98/13243

PCT Pub. Date: Apr. 2, 1998

(30) Foreign Application Priority Data

Sep. 23, 1996 (DE) .............................. 196 38 920

(51) Int. Cl.[7] ........................................ B60T 8/40
(52) U.S. Cl. .................. 303/116.2; 303/11; 303/113.3; 303/901
(58) Field of Search ............. 303/DIG. 2, 901, 303/113.2, 113.3, 10, 11, 116.2, 116.1

(56) References Cited

U.S. PATENT DOCUMENTS

| | | | |
|---|---|---|---|
| 5,169,214 | * 12/1992 | Holzmann et al. | 303/113.2 |
| 5,195,810 | * 3/1993 | Ocvirk et al. | 303/116.1 |
| 5,246,280 | * 9/1993 | Sigl | 303/113.2 |
| 5,275,476 | * 1/1994 | Maisch | 303/113.2 |
| 5,383,718 | * 1/1995 | Burgdorf et al. | 303/113.2 |
| 5,388,898 | * 2/1995 | Reinartz et al. | 303/116.2 |
| 5,628,550 | * 5/1997 | Zaviska et al. | 303/116.1 |
| 5,673,979 | * 10/1997 | Kuromitsu et al. | 303/116.1 |
| 5,918,948 | * 7/1999 | Burgdorf et al. | 303/113.2 |

FOREIGN PATENT DOCUMENTS

| | | |
|---|---|---|
| 33 23 402 | 10/1984 | (DE) . |
| 39 03 532 | 9/1989 | (DE) . |
| 39 06 141 | 9/1989 | (DE) . |
| 40 00 837 | 7/1991 | (DE) . |
| 40 27 565 | 3/1992 | (DE) . |
| 40 37 468 | 5/1992 | (DE) . |
| 41 04 069 | 8/1992 | (DE) . |
| 41 22 643 | 1/1993 | (DE) . |
| 41 38 027 | 5/1993 | (DE) . |
| 44 25 578 | 1/1996 | (DE) . |
| WO 92/05990 | * 4/1992 | (WO) .............................. 303/113.2 |
| WO 92/18363 | * 10/1992 | (WO) .............................. 303/116.1 |

OTHER PUBLICATIONS

Search Report of the German Patent Office for German Appl. 196 38 920.8.

* cited by examiner

Primary Examiner—Matthew C. Graham
Assistant Examiner—Devon Kramer
(74) Attorney, Agent, or Firm—Rader, Fishman & Grauer PLLC

(57) ABSTRACT

A hydraulic brake system which incorporates several mutually independent brake circuits and does not require additional energy for conducting brake-slip control actions or stability control actions.

8 Claims, 5 Drawing Sheets

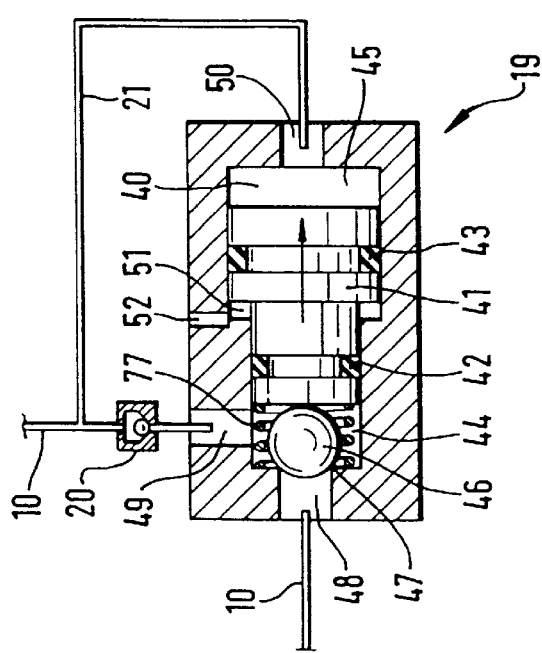
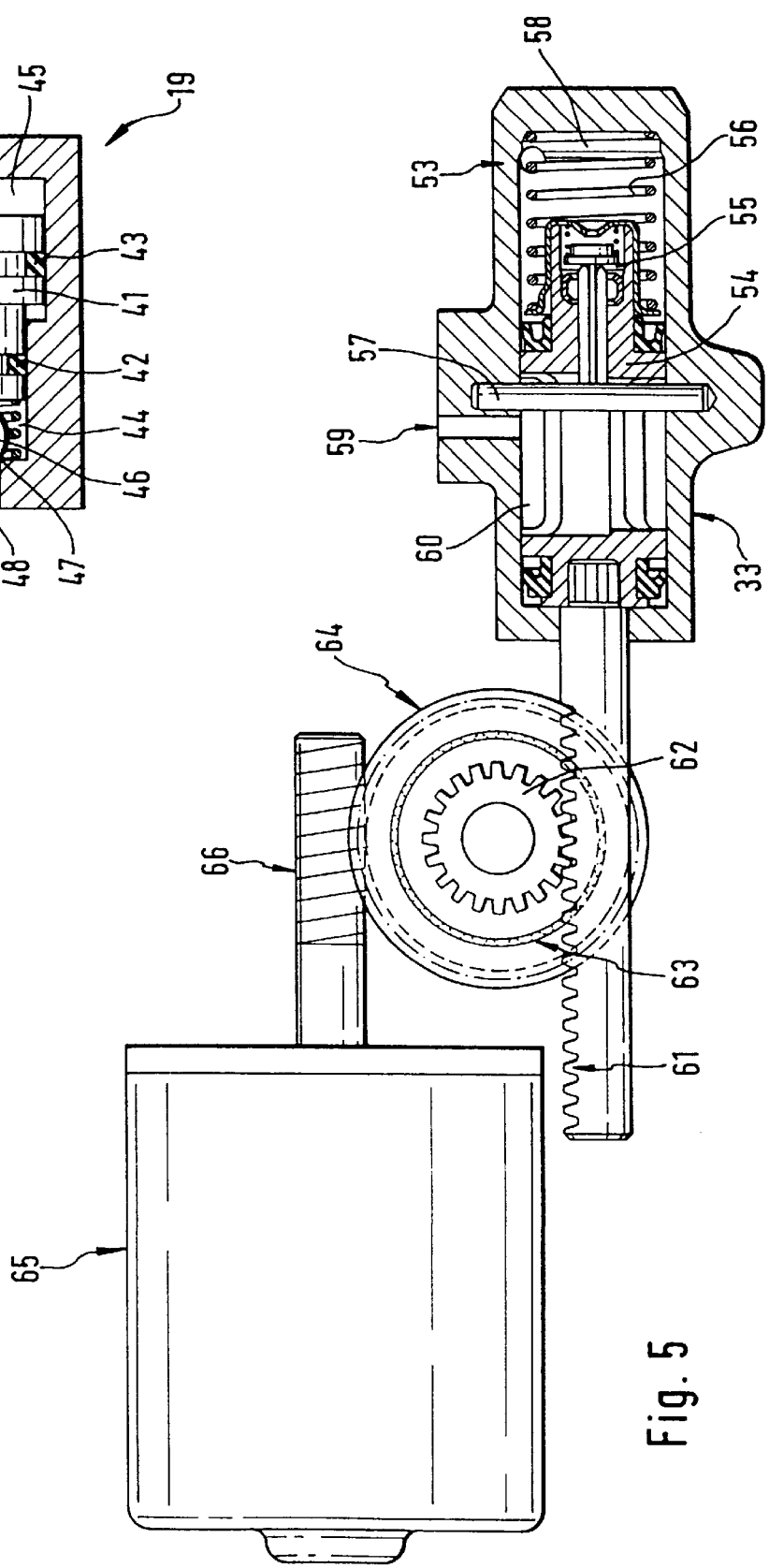

HYDRAULIC BRAKE SYSTEM WITH HYDRAULIC SERVO BRAKE

The present invention relates to a hydraulic brake system with a master cylinder that can be actuated by means of a brake pedal, a brake line connecting the master cylinder with a brake cylinder, and a hydraulic unit with a motor-driven pump for boosting the brake force, wherein the delivery flow of the pump is supplied to the suction side of the pump via a pressure control valve within a circuit.

Hydraulic brake systems of the type described above are known from the Ate Brake Handbook, 2nd edition, 1960, pp. 60–65. In the brake systems described in the handbook, a motor-driven high-pressure pump delivers a constant flow of fluid that circulates within a circuit, flowing through a restrictor gap between a boosting valve located on the master cylinder and the piston of the master cylinder and then back to a reservoir, from which the pump draws in the pressure fluid. When the brake pedal is actuated, the boosting valve is displaced against the piston of the master cylinder, and this causes the flow in the restrictor gap to be restricted. This in turn causes pressure to be built up in the ring-shaped space between the boosting valve and the piston of the master cylinder. This pressure displaces the piston of the master cylinder in the direction of braking, and it becomes effective as pedal return force at the boosting valve. Due to the comparably higher manufacturing and operating costs as compared to vacuum brake force boosters, these known brake systems with hydraulic brake force boosting never achieved significance in practice.

Another known device for hydraulically boosting the brake force uses the energy supply already available in the motor vehicle by having the hydraulic pump for the steering servo charge a hydraulic accumulator via a pressure-controlled current regulator. The pressure fluid stored under pressure is led to a boosting piston via a control valve that is actuated by the brake pedal, and this boosting piston actuates the piston of a master cylinder. In this design, an additional pump circuit is required for a brake-slip control.

In another hydraulic brake system, known from DE 40 35 906 Al, the pressure fluid delivered by a pump is supplied, via a pressure reducing valve, to a pressure control valve that is actuated by the brake pedal. The pressure control valve regulates the pressure in the brake line depending on the force exerted on the brake pedal. The pressure reducing valve is connected to the brake line via a control line and arranged in such a way that the pressure on the inlet side of the pressure reducing valve always is 30 bar higher than the pressure in the brake line. This known brake pressure control device is not suitable for connecting several mutually independent brake circuits.

DE 44 46 525 Al describes a hydraulic motor vehicle brake system for driving stability control and anti-slip control with a brake-slip control system that works on the basis of the return principle, wherein the dual-circuit master cylinder is actuated by a vacuum brake force booster that can be regulated by means of a brake pedal. The brake system has a pump whose pressure side is connected to the brake line, and said pump operates as a recirculating pump for brake-slip control and as a brake pressure transducer for driving stability or anti-slip control. The pump is not in operation during braking procedures that do not use the control devices. When the pump operates as a brake pressure transducer, the suction side of the pump can be connected to the brake line via a valve, with a precharging pressure being generated in the brake line by means of a precharging pump in order to improve the intake action.

The object of the present invention is to create a brake system of the type mentioned above, which, firstly, is characterized by a simple design and low construction costs, secondly, can have several, mutually independent brake circuits, and, thirdly, does not need an additional energy supply for brake-slip control actions or an automatic brake actuation, e.g. driving stability control.

According to the present invention, this object is achieved in that the pump, the pressure control valve and a non-return valve that closes in the direction of the master cylinder are arranged parallel to one another in the brake line of a brake system of the type mentioned above, wherein the suction side of the pump and the outlet of the pressure control valve are connected to the master cylinder and the pressure side of the pump and the inlet of the pressure control valve are connected to the brake cylinder and wherein the pressure control valve regulates the pump pressure in dependence of the pressure in the section of the brake line connected to the master cylinder and the hydraulic surfaces of the pressure control valve are designed in such a way that the ratio between pump pressure and master cylinder pressure is greater than 1.

In the brake system according to the present invention the actuating force exerted on the brake pedal is not boosted in the master cylinder or brake pressure transducer, but in the brake line, wherein the integrated hydrodynamic pump circuit divides said brake line into a section with low pressure on the side of the master cylinder and a section with higher pressure on the side of the brake cylinders. The pump circuit also is not controlled mechanically by means of the brake pedal but through the output pressure of the master cylinder, which is applied to the control piston of the pressure control valve. The hydrodynamic pump circuit is closed with the exception of the attachments for the brake line and, consequently, it also is part of the hydrostatic brake circuit. Thus, whenever the brake force is boosted, the flow quantity of the pump always corresponds only to the pressure difference between master cylinder pressure and brake cylinder pressure. The non-return valve arranged parallel to the pump circuit ensures a direct connection between the master cylinder and the brake wheel cylinder in order to obtain a quick brake actuation independently of the pump circuit. When the pressure in the master cylinder is reduced, the pressure in the brake cylinder is reduced through the pressure control valve.

The brake system according to the present invention allows hydraulic brake force boosting with low structural costs and irrespective of other servo-systems in the vehicle. It is particularly well-suited for motor vehicles that do not have available an adequate vacuum for operating a pneumatic vacuum brake force booster. Since the brake force boosting is controlled only hydraulically in the brake system according to the present invention, it can be used with any type of master cylinder. It also is possible to integrate a hydrodynamic boosting circuit according to the present invention in an already existing brake system. Furthermore, the brake system according to the present invention offers the advantage that a brake-slip control can be obtained through few additional measures and devices, because the existing pump is used as a recirculating pump. In the same way the brake system according to the present invention can be expanded into a brake system with driving stability control through few additional measures and devices.

According to the present invention, an electric motor can be used to drive the pump, with said electric motor being switched on when a braking procedure is initiated. This does not detrimentally affect the response behavior of the brake system, since the pressure build-up while the pump is starting up is supported by the master cylinder.

According to the present invention, the pressure control valve can be designed as a pressure limiting valve, for which purpose a non-return valve closing in the direction of the pressure limiting valve is arranged between the outlet of the pressure limiting valve and the point where the control line of the pressure limiting valve runs into the brake line. Furthermore, it may be provided that the control piston of the pressure control valve be designed as a stepped piston with atmospheric pressure being applied to its stepped surface.

A further embodiment of the brake system according to the present invention, which allows control of the brake slip, may be achieved in accordance with the present invention in that the suction side of the pump can be disconnected from the master cylinder, from the non-return valve located in the brake line and from the pressure control valve by means of a block valve, in that the supply of pressure fluid to the brake cylinder can be blocked by a first control valve and the brake cylinder can be connected to a return line leading to a low-pressure accumulator and to the suction side of the pump by means of a second control valve, and in that the block valve and the control valves can be controlled by a brake-slip control device.

By adding just a few components to such a brake system, an automatic brake actuation to control the driving stability can be realized. According to the present invention, such expansion may consist of equipping the master cylinder with a device for precharging the brake system and providing a stop valve with a parallel pressure limiting valve in line with the pressure control valve, wherein the precharging device, stop valve, block valve and control valves can be regulated by means of a driving stability control device. An electromechanical precharging drive is particularly suitable for use as a precharging device. It is provided on the master cylinder and is equipped with an electric motor and gearing that transforms the rotary motion of the electric motor into a linear motion to actuate the piston of the master cylinder. If the master cylinder is not to be used for the precharging procedure, then, according to the present invention, a charge pump driven by an electric motor may be provided. Said charge pump is connected to the reservoir attachment of the master cylinder, wherein the port between the reservoir attachment and the master cylinder can be blocked by a valve. When the master cylinder is a tandem master cylinder, it would suffice to connect the charge pump to the reservoir attachment of the plunger rod circuit. The floating circuit is then precharged by hydraulically displacing the floating piston of the tandem master cylinder.

Since the charge pump has to deliver only a limited volume of pressure fluid to the brake system, it may, according to the present invention, consist of a charge cylinder resembling a master cylinder whose piston is displaced by an electromechanical drive. The electromechanical drive may be equipped with a sliding clutch in order to limit the pressure generated by the precharging procedure.

The present invention is described in more detail on the basis of embodiments shown in the following drawings:

FIG. 4 shows an axial section of an embodiment of a pressure control valve.

FIG. 5 is a schematic representation of an electromechanically actuated charge cylinder.

Figure 1:
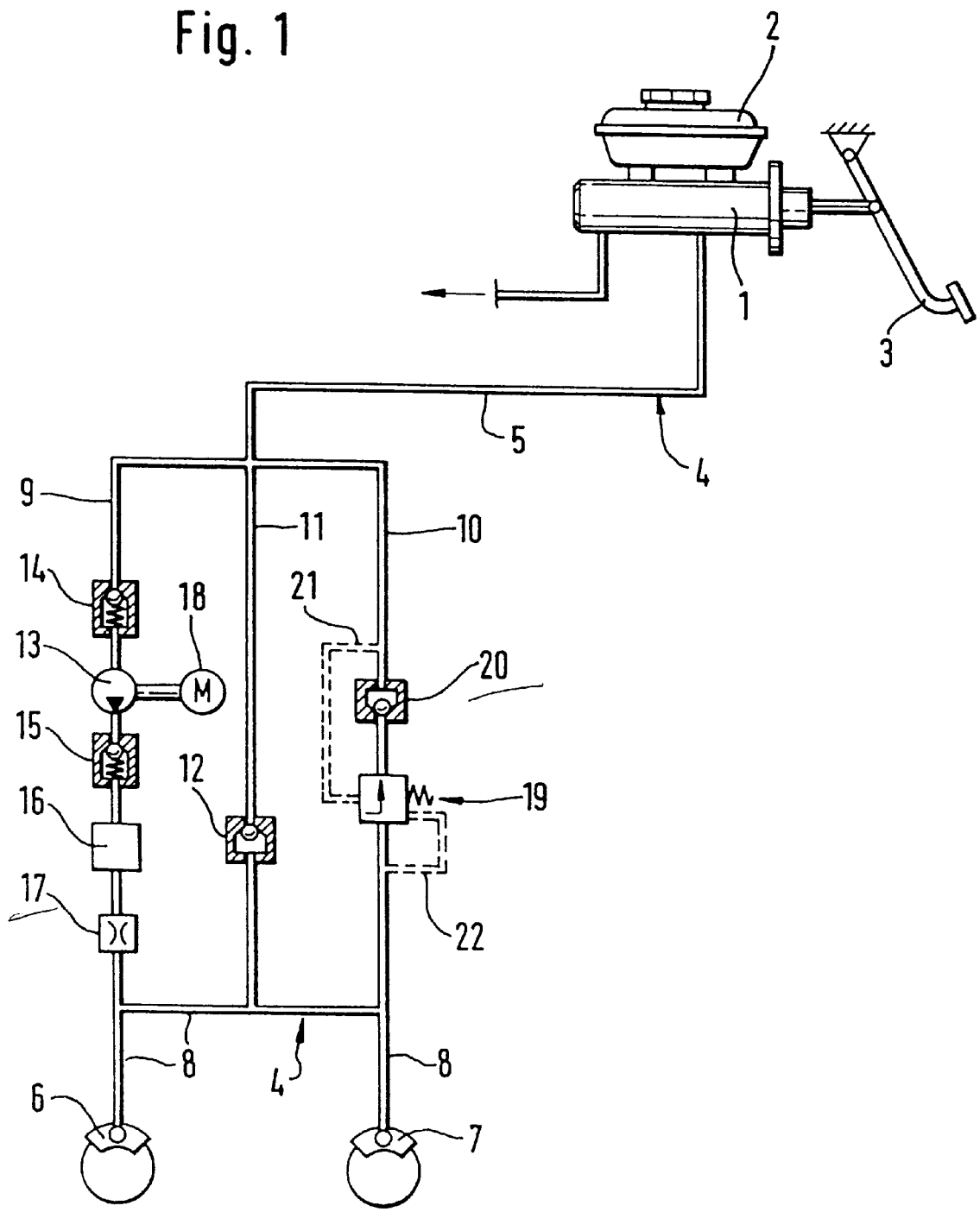
FIG. 1 is the circuit diagram of a brake circuit of a hydraulic dual-circuit brake system with hydraulic brake force boosting according to the present invention.

FIG. 1 shows one of two identical brake circuits that are connected to the two working chambers of a tandem master cylinder 1 with a reservoir 2 for pressure fluid. A brake pedal 3 is provided, by means of which the tandem master cylinder 1 is actuated. The brake circuit has a brake line 4 that is made up of a section 5 on the side of the master cylinder and sections 8 which are connected to two brake cylinders 6, 7. The sections 5, 8 are connected by the lines 9, 10 of a pump circuit and line 11 which is provided with a non-return valve 12 that closes in the direction of the tandem master cylinder 1. A pump 13 with intake valve 14 and pressure valve 15 is arranged in line 9, wherein said pump delivers, via a damping chamber 16 and a throttle 17, in the direction of the sections 8 of the brake line 4. The pump 13 is driven by an electric motor 18. A pressure limiting valve designed as a pressure control valve 19 which opens in the direction of the tandem master cylinder 1 is provided in line 10. A non-return valve 20 is provided downstream of the pressure control valve 19. The pressure control valve 19 is connected to the line 10 via a control line 21 parallel to the non-return valve 20. Another control line 22 connects the pressure control valve 19 with the section of line 10 on the side of the brake cylinder.

When the tandem master cylinder 1 is actuated by the brake pedal 3, the brake fluid displaced as a result is supplied, via the line 11 and the non-return valve 12, to the brake cylinders 6, 7 so that the brakes are quickly filled and applied. At the same time the electric motor 18 is switched on, e.g. by means of a switch actuated by the brake pedal, causing the pump 13 to start up. Since the pressure control valve 19 is held closed by the pressure built up in the meantime by the tandem master cylinder, the flow of fluid delivered by the pump 13 as it starts up causes an increase in pressure that exceeds the master cylinder pressure in the sections 8 of the brake line and the brake cylinders 6, 7. The pressure increase is limited by the pressure control valve 19, which will not open until the proportional ratio between brake cylinder pressure and master cylinder pressure as it is determined by the design of the hydraulically effective surfaces of the pressure control valve 19 is reached. This pressure ratio is maintained by the pressure control valve for the duration of the brake actuating procedure; however, the pressure control valve restricts the flow of the pump 13 more or less strongly depending on the master cylinder pressure in order to adjust the amount of the brake cylinder pressure accordingly. When the master cylinder pressure is reduced by releasing the brake pedal 3, i.e. to end the braking procedure, the brake fluid flows from the brake cylinders 6, 7 back to the tandem master cylinder 1 via the open pressure control valve 19. The pump 13 is switched off as soon as the brake pedal 3 reaches its original position or the pressure in the master brake cylinder 1 is reduced completely.

In the further embodiment of the brake circuit described above and shown in FIG. 2, an electromagnetically actuatable intake valve 23 that is open in its inactive position and can be closed by exciting the actuating magnet is integrated in each section 8 of the brake line 4 leading to a brake cylinder 6 or 7. Non-return valves 24 opening in the direction of the pump circuit are provided parallel to the intake valves 23. In addition, each of the brake cylinders 6, 7 is connected to a return line 26 via an electromagnetically actuatable discharge valve 25 that is closed in its inactive position and can be opened by exciting the actuating magnet. The return line 26 leads to a low-pressure accumulator 27 and to the suction valve 14 of the pump 13 via a non-return valve 28. Furthermore, an electromagnetically actuatable block valve 29, which is open in its inactive position, is provided in the line 9 between the attachments of the return line 26 and the line 11. The line 9 and, hence, the connection between the suction side of the pump 13 and the tandem master cylinder 1 and the pressure control valve 19 can be blocked with said block valve 29.

The magnets of the intake valves 23, the discharge valves 25 and the block valve 29 are controlled by an electronic brake-slip control unit which emits valve control signals to modulate the brake pressure in the brake cylinders 6, 7 when control operations are required. If, for example, the brake pressure in the brake cylinder 6 is to be reduced, the intake valve 23 of the brake cylinder 6 is closed and the discharge valve 25 is opened. As a result, pressure fluid flows from the brake cylinder into the return line 26 via the discharge valve 25, and then it flows into the low-pressure accumulator 27. At the same time, the block valve 29 is closed, whereupon the pressure on the suction side of the pump 13 drops and the pump 13 is forced to return the pressure fluid volume contained in the low-pressure accumulator 27 to sections 8 of the brake line 4 or, if it cannot be contained there, to return it to the tandem master cylinder 1 via the pressure control valve 19. In order to build up pressure again, the intake valve 23 and the discharge 25 of the brake cylinder 6 are reset to their inactive positions. If the pressure fluid volume available in the low-pressure accumulator does not suffice for building up the required pressure, the block valve 29 is opened again, so that the pump 13 can remove the required pressure fluid from the tandem master cylinder 1. When the control procedure is over, the block valve 29 remains blocked until the pump has emptied out the low-pressure accumulator 27 and delivered the pressure fluid volume back to the tandem master cylinder 1.

Figure 2:
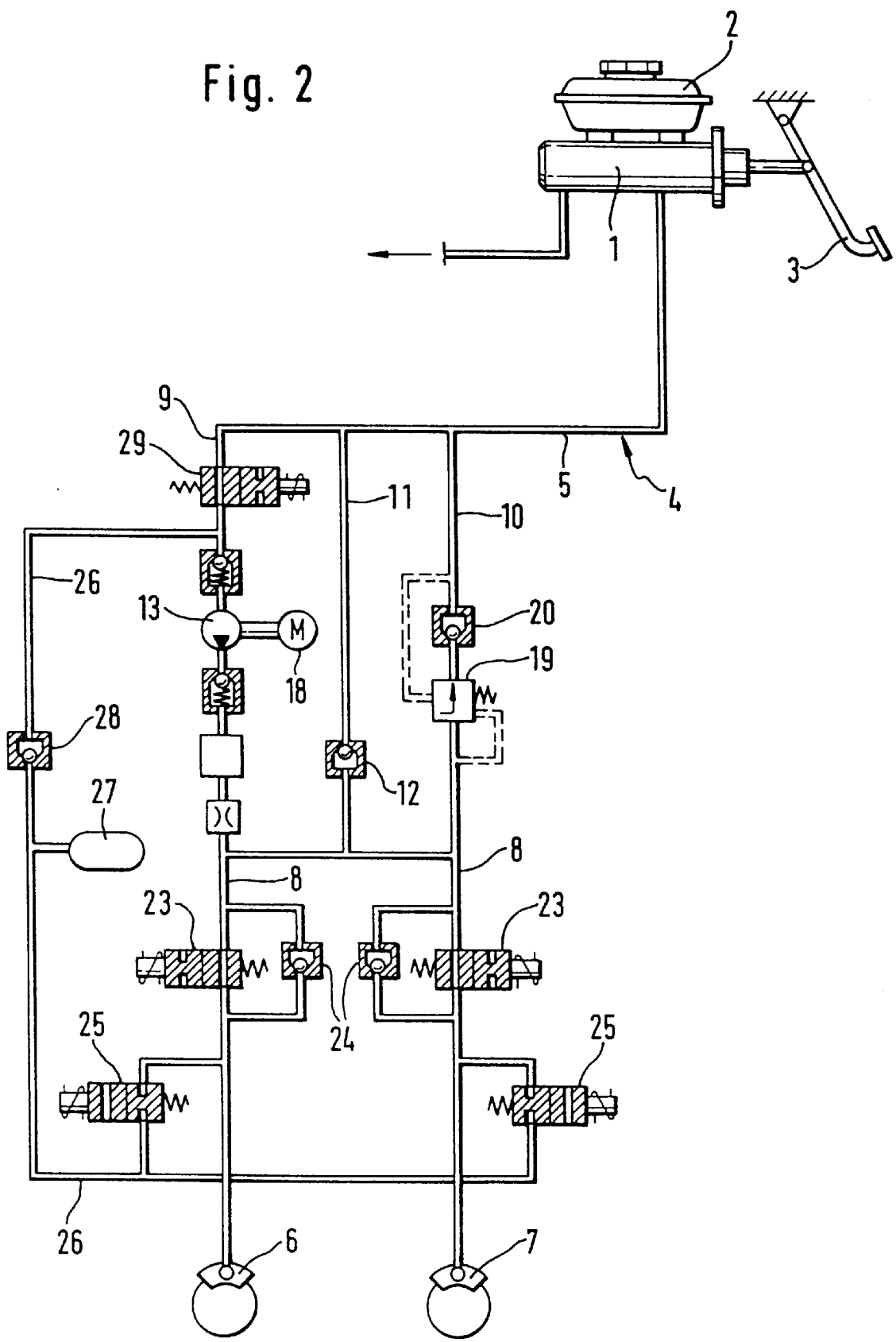
FIG. 2 is the circuit diagram of a brake circuit of a brake system according to FIG. 1, which was expanded to comprise a brake-slip control device by adding the corresponding components.
Figure 3:
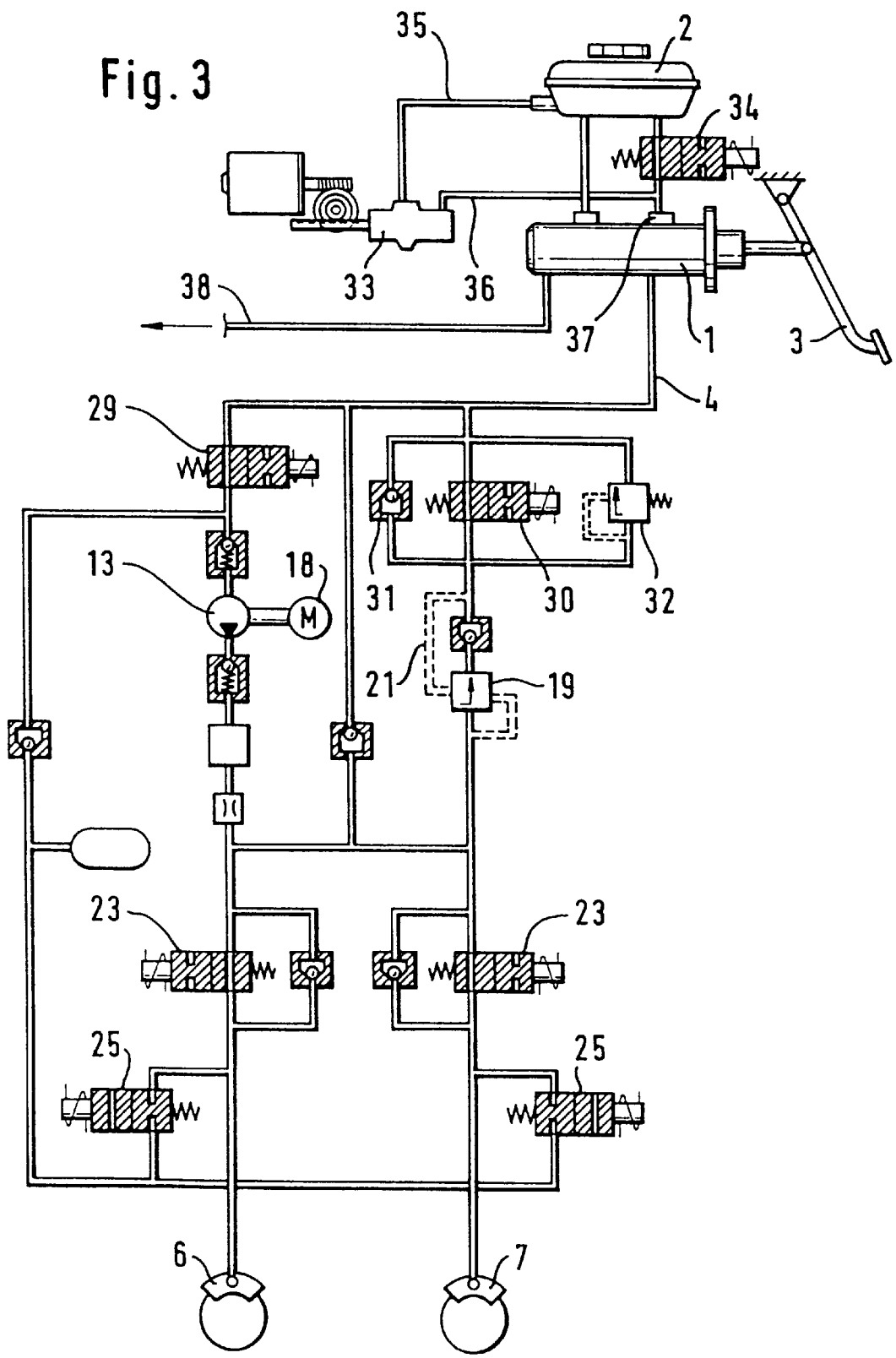
FIG. 3 is the circuit diagram of a brake circuit of a brake system according to FIG. 2, which was expanded to comprise a driving stability and traction control device by adding the corresponding components.

An expansion of the brake system according to FIG. 2 is shown in FIG. 3. In this expanded system an automatic, electronically controlled brake actuation to control the driving stability or the traction slip is possible. For this purpose, an electromagnetically actuatable stop valve 30 is additionally provided in the line 10 downstream of the attachment of the control line 21. A non-return valve 31 opening in the direction of the control line 21 and a pressure limiting valve 32 opening in the direction of the brake line 4 are arranged parallel to said stop valve 30. Furthermore, the tandem master cylinder 1 is provided with a device for precharging the brake circuits, with such device consisting of an electromechanically driven charge cylinder 33 and a solenoid valve 34. The charge cylinder 33 is described in more detail below in connection with FIG. 5. It is connected to the reservoir 2 via a low-pressure line 35 and to the reservoir attachment 37 of the working chamber of the tandem master cylinder 1 on the side of the plunger rod via a pressure line 36. The port between the reservoir 2 and the reservoir attachment 37 can be blocked by the solenoid valve 34.

When an automatic brake actuation is to be initiated, the control unit switches on the drive of the charge cylinder 33 and the electric motor 18 of the pump 13 and, at the same time, closes the stop valve 30 and the solenoid valve 34. The charge cylinder 33 fills the brake circuit and a precharge pressure of up to 6 bar is built up, which ensures that brake pressure will be generated quickly with the aid. of the pump 13. The precharge pressure build-up in the plunger rod circuit of the tandem master cylinder 1 also displaces the floating piston of the tandem master cylinder 1; moreover, this causes build-up of a corresponding precharge pressure in the second brake circuit (not shown) connected to brake line 38, the design of which corresponds to that of the brake circuit shown. By closing the stop valve 30, the entire pressure fluid volume delivered by the pump 13 is available for building up pressure in the sections 8 of the brake line 4. As in the brake-slip control, the pressure fluid volume can be supplied to the brake cylinders 6, 7 for a controlled pressure modulation by regulating the intake valves 23 and the discharge valves 25 as well as the block valve 29 appropriately. The excessive pressure fluid volume is returned to the tandem master cylinder 1 or the charge cylinder 33 via the pressure control valve 19 and the pressure limiting valve 32. For this purpose, the opening pressure of the pressure limiting valve 32 and the switching pressure of the pressure control valve 19 have to be coordinated with one another in such a way that an appropriate maximum pressure can be built up in the sections 8 of the brake line 4.

FIG. 4 shows an embodiment of the pressure control valve 19. A stepped piston 41 is displaceably mounted in a cylinder housing 39 with a stepped cylinder bore 40 and sealed with sealing rings 42, 43. With its smaller face side the stepped piston 41 borders on a valve housing 44 and with its larger face side it borders on a control housing 45. The valve housing 44 holds a valve ball 46 and a pressure spring that holds open the valve ball when it is in an unpressurized state; when active the valve ball closes a valve seat 47. A bore 48 connects the valve seat to the line 4 leading to the pressure side of the pump 13. A bore 49 connects the valve housing 44 to the section of line 10 that is attached to the suction side of the pump 13. The control housing 45 is connected to the control line 21 via a bore 50. The ring-shaped space 51 delimited by the piston step is connected to the atmosphere by means of a bore 52.

The drawing shows the pressure control valve in a closed state, which occurs when pressure is applied to the control line 21. The closing force is determined by the size of the ring-shaped surface on the step of the stepped piston 41. The pressure control valve can only be opened when the pressure in the bore 48 exceeds the pressure in the valve housing 44 and the control housing 45 by a quantity that corresponds to the pressure in these housings multiplied by the quotient of the ring-shaped surface of the piston step and the cross-sectional area of the valve seat 47. Thus, the closing force increases proportionally to the pressure built up in the valve housing 44 and control housing 45 by the master cylinder, with the ratio between closing force and master cylinder pressure being determined by the relation between the above-mentioned surfaces. When the brake is released and the master cylinder pressure is reduced to zero, the valve is opened by the fluid flowing back to the master cylinder as well as a pressure spring 77, and it remains open until pressure is built up again.

FIG. 5 shows an embodiment of the electromechanically actuatable charge cylinder 33. The design of the charge cylinder 33 corresponds to that of a master cylinder with a cylinder housing 53, a piston 54 and a central valve 55 mounted in a piston 54. A pressure spring 56 pushes the piston 54 to the inactive position shown in the drawing, in which the central valve 55 is held open by a pin 57. In this position the central valve 55 connects a pressure chamber 58 delimited by the face side of the piston 54 with a reservoir chamber 60 that can be connected to a reservoir via a bore 59. Attached to the piston 54 is a gear rack 61 which is in mesh with a gear wheel 62 of a gearing. The gear wheel 62 is connected to a worm gear 64 by means of a sliding clutch 63, with the worm gear 64 being engaged in a worm 66 that is driven by an electric motor 65. Any other type of reducing gear can be used in the place of a worm gearing. The sliding clutch 63 in the worm gear 64 is designed in such a way that it slides through when there is a precharge pressure of 6 bar in the pressure chamber 58 and accordingly also when the piston 54 reaches its end position.

When the electric motor 65 is switched on to activate the precharge procedure, it drives the sliding clutch 63 via the worm gearing 66, 64 and the rack-and-pinion gear 61, 62 drives the piston 54, which causes pressure fluid to be delivered to the reservoir attachment 37 of the tandem master cylinder 1 and through this to the brake circuit. When the precharge pressure reaches 6 bar, the sliding clutch prevents any further increase in pressure. Thus, how long the electric motor 65 remains switched on can be determined by the largest possible precharge stroke. Pressure-controlled regulation is not required. When the pump 13 returns excess volume to the charge cylinder 33, this pushes the piston 54 back without the electric motor 65 being switched on, because in this case the sliding clutch 63 can slip through, too. Consequently, the electronic control is rendered particularly simple.

Figure 6:
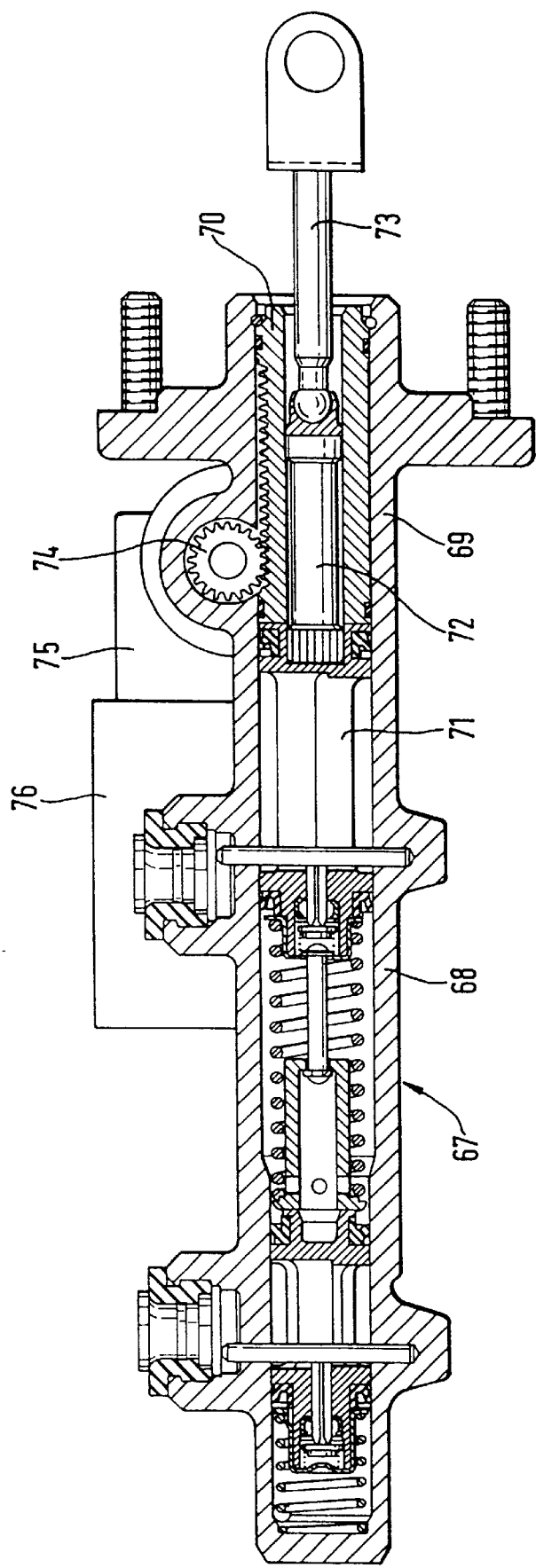
FIG. 6 shows an axial section of a master cylinder with an electromechanical precharging drive.

As the embodiment described in FIG. 6 shows, the precharging required for automatic braking procedures can also be achieved by means of an electromechanically actuatable tandem master cylinder 67 instead of a charge cylinder. For this purpose, the open end of the tandem master cylinder housing 68 is fitted with an extension 69 with a gear rack sleeve 70 which supports the plunger rod piston 71. A plunger 72 that is attached to the plunger rod piston 71 is located within the bore of the gear rack sleeve 70, and the plunger rod 73 is attached to said plunger 72 by means of a socket joint. A gear wheel 74 which displaces the gear rack sleeve 70 is arranged in a tangential bore of the extension 69. The gear wheel 74 is driven in the same way as described in the embodiment according to FIG. 5, i.e. by means of an electric motor 76 and a gearing 75.

When the tandem master cylinder 67 is actuated in the normal way, i.e. by the brake pedal, the plunger 72 glides in the gear rack sleeve 70, without the feeling on the pedal being affected. When the precharge drive is switched on, the plunger rod piston 71 is displaced by the gear rack sleeve 70 in the direction in which the brakes are applied. Here again a sliding clutch is active in the gearing 75, which limits the actuation forces in both directions.

LIST OF REFERENCE NUMBERS

1 Tandem master cylinder
2 Reservoir
3 Brake pedal
4 Brake line
5 Section
6 Brake cylinder
7 Brake cylinder
8 Section
9 Line
10 Line
11 Line
12 Non-return valve
13 Pump
14 Suction valve
15 Pressure valve
16 Damping chamber
17 Throttle
18 Electric motor
19 Pressure control valve
20 Non-return valve
21 Control line
22 Control line
23 Intake valve
24 Non-return valve
25 Discharge valve
26 Return line
27 Low-pressure accumulator
28 Non-return valve
29 Block valve
30 Stop valve
31 Non-return valve
32 Pressure limiting valve
33 Charge cylinder
34 Solenoid valve
35 Low-pressure line
36 Pressure line
37 Reservoir attachment
38 Brake line
39 Cylinder housing
40 Cylinder bore
41 Stepped piston
42 Sealing rings
43 Sealing rings
44 Valve housing
45 Control housing
46 Valve ball
47 Valve seat
48 Bore
49 Bore
50 Bore
51 Ring-shaped space
52 Bore
53 Cylinder housing
54 Piston
55 Central valve
56 Pressure spring
57 Pin
58 Pressure chamber
59 Bore
60 Reservoir
61 Gear rack
62 Gear wheel
63 Sliding clutch
64 Worm gear
65 Electric motor
66 Worm
67 Tandem master cylinder
68 Master cylinder housing
69 Extension
70 Gear rack sleeve 71 Plunger rod piston
72 Plunger
73 Plunger rod
74 Gear wheel
75 Gearing
76 Electric motor

What is claimed is:

1. A hydraulic brake system, comprising:

a master cylinder that can be actuated by a brake pedal, a brake line connecting the master cylinder to a brake cylinder, and a hydraulic unit for boosting the brake force with a pump driven by a motor, wherein the pumps delivery flow is supplied to a suction side of the pump by way of a pressure control valve within a circuit, wherein the pump and the pressure control valve are arranged parallel to one another in the brake line, wherein the suction side of the pump and an outlet of the pressure control valve are connected to the master cylinder and the pressure side of the pump and an inlet of the pressure control valve are connected to the brake cylinder, and wherein the pressure control valve regulates the pump pressure in dependence of the section of the brake line that is connected to the master cylinder and a hydraulically effective surface of the pressure control valve are designed in such a way that the ratio between pump pressure and master cylinder pressure is greater than 1, a non-return valve closing in the direction of the master cylinder is arranged parallel to the pump and to the pressure control valve in the brake line;

a non-return valve that closes in the direction of the pressure control valve is arranged at the outlet of the pressure control valve which runs in the direction of a line connected to the section on the side of the master cylinder; a restrictor which interconnects the pump and the brake cylinder, wherein, the suction side of the pump is disconnected from the master cylinder by a block valve, from the non-return valve arranged in the brake line and from the pressure control valve, in that a supply of pressure fluid to the brake cylinder can be blocked by a first control valve arranged in the brake line and the brake cylinder can be connected to a return line leading to a low-pressure accumulator and to the suction side of the pump by means of a second control valve, and in that the block valve and the control valves can be controlled by a brake-slip control unit, wherein the master cylinder is connected to a unit for precharging the brake system, and that a stop valve with a parallel pressure limiting valve is arranged in line with the pressure control valve, wherein the precharging unit, the stop valve, the block valve and the control valves can be regulated by a driving stability or anti-slip control unit, wherein the device for precharging the brake system is a charge pump driven by an electric motor, which is connected to the reservoir attachment of the master cylinder, wherein the port between the reservoir attachment and the reservoir is switched by a valve.

2. A brake system according to claim 1, wherein the pump is driven by an electric motor, wherein said electric motor is switched on as soon as a braking procedure is initiated.

3. A brake system according to claim 1, wherein the pressure control valve is designed as a pressure limiting valve, and that a control line which is connected to the pressure control valve is arranged between the non-return valve and the section of line that is on the side of the master cylinder.

4. A brake system according to claim 3, the pressure control valve includes a control piston designed as a stepped piston, with atmospheric pressure being applied to its stepped surfaces and discharge pressure being applied to its end faces.

5. A brake system according to claim 1, wherein the charge pump consists of a charge cylinder, having a piston, wherein the piston can be displaced by an electromechanical drive.

6. A brake system according to claim 1, wherein, the unit for precharging the brake system is an electromechanical drive that is provided on the master cylinder, with said drive displacing the piston of a master cylinder.

7. A brake system according to claim 1, further including a sliding clutch attached between the charge pump and the electric motor.

8. A brake system according to claim 5, wherein the electromechanical drive has an electric motor and a gearing which transforms the rotational motion of the electric motor into a straight-line motion.

* * * * *